(12) United States Patent
Lee

(10) Patent No.: US 10,353,875 B2
(45) Date of Patent: Jul. 16, 2019

(54) METHOD FOR MANAGING ATTRIBUTE INFORMATION OF FILES

(71) Applicant: GAEASOFT CO., LTD., Seoul (KR)

(72) Inventor: Doo Hyung Lee, Seoul (KR)

(73) Assignee: GAEASOFT CO., LTD., Seoul (KR)

( * ) Notice: Subject to any disclaimer, the term of this patent is extended or adjusted under 35 U.S.C. 154(b) by 0 days.

(21) Appl. No.: 16/098,408

(22) PCT Filed: Jun. 9, 2017

(86) PCT No.: PCT/KR2017/006050
§ 371 (c)(1),
(2) Date: Nov. 1, 2018

(87) PCT Pub. No.: WO2017/213472
PCT Pub. Date: Dec. 14, 2017

(65) Prior Publication Data
US 2019/0121791 A1    Apr. 25, 2019

(30) Foreign Application Priority Data
Jun. 10, 2016 (KR) .................. 10-2016-0072752

(51) Int. Cl.
*G06F 17/30* (2006.01)
*G06F 16/18* (2019.01)

(52) U.S. Cl.
CPC ................. *G06F 16/1873* (2019.01)

(58) Field of Classification Search
CPC ............ G06F 17/2247; G06F 16/907
(Continued)

(56) References Cited

U.S. PATENT DOCUMENTS 6,606,748 B1 * 8/2003 Tomioka ............... H04H 20/26
348/E7.031
7,290,130 B2 * 10/2007 Ikeda .................. H04L 63/0209
713/153
(Continued)

FOREIGN PATENT DOCUMENTS

EP    1 406 181 A2    4/2004
JP    11-259459 A    9/1999
(Continued)

OTHER PUBLICATIONS

International Search Report and Written Opinion, dated Sep. 28, 2017, for International Application No. PCT/KR2017/006050, 10 pages.
(Continued)

*Primary Examiner* — Jean M Corrielus
(74) *Attorney, Agent, or Firm* — Husch Blackwell LLP

(57) ABSTRACT

A method for managing attribute information of a file and a computing device using the same is provided. The method includes steps of: (a) a first computing device receiving a file with a first origin information inserted into attribute information thereof from a second computing device or from a third computing device connected via the second computing device; and (b) the first computing device instructing a file system to acquire a second origin information from information related to the first computing device, the second computing device, or the third computing device connected via the second computing device, and to insert the second origin information into the attribute information of the file along the first origin information therein.

30 Claims, 2 Drawing Sheets

(58) Field of Classification Search
USPC .......................... 707/769; 709/219; 715/234
See application file for complete search history.

(56) References Cited

U.S. PATENT DOCUMENTS

| | | | | |
|---|---|---|---|---|
| 7,590,667 | B2* | 9/2009 | Yasuda | G06F 16/184 |
| 8,825,697 | B2* | 9/2014 | Foresti | G06F 17/2247 |
| | | | | 707/769 |
| 9,807,180 | B2* | 10/2017 | Itasaki | H04L 67/10 |
| 2004/0205152 | A1* | 10/2004 | Yasuda | G06F 16/184 |
| | | | | 709/217 |
| 2006/0195461 | A1* | 8/2006 | Lo | G06F 16/93 |
| 2009/0199090 | A1* | 8/2009 | Poston | G06F 16/907 |
| | | | | 715/255 |
| 2013/0297645 | A1* | 11/2013 | Foresti | G06F 17/2247 |
| | | | | 707/769 |
| 2014/0304592 | A1* | 10/2014 | Foresti | G06F 17/2247 |
| | | | | 715/234 |
| 2015/0281375 | A1* | 10/2015 | Itasaki | H04L 67/10 |
| | | | | 709/219 |

FOREIGN PATENT DOCUMENTS

| | | |
|---|---|---|
| KR | 10-2004-0079376 A | 9/2004 |
| KR | 10-2009-0069942 A | 7/2009 |
| KR | 10-2012-0116295 A | 10/2012 |
| KR | 10-1589969 B1 | 1/2016 |

OTHER PUBLICATIONS

Korean Notice of Allowance, dated Jul. 20, 2017, for Korean Application No. 10-2016-0072752, 2 pages. (With English Machine Translation).

Korean Office Action, dated Mar. 6, 2017, for Korean Application No. 10-2016-0072752, 3 pages. (With English Machine Translation).

Korean Office Action, dated Sep. 30, 2016, for Korean Application No. 10-2016-0072752, 3 pages. (With English Machine Translation).

* cited by examiner

[Fig. 1]
[Fig. 2a]
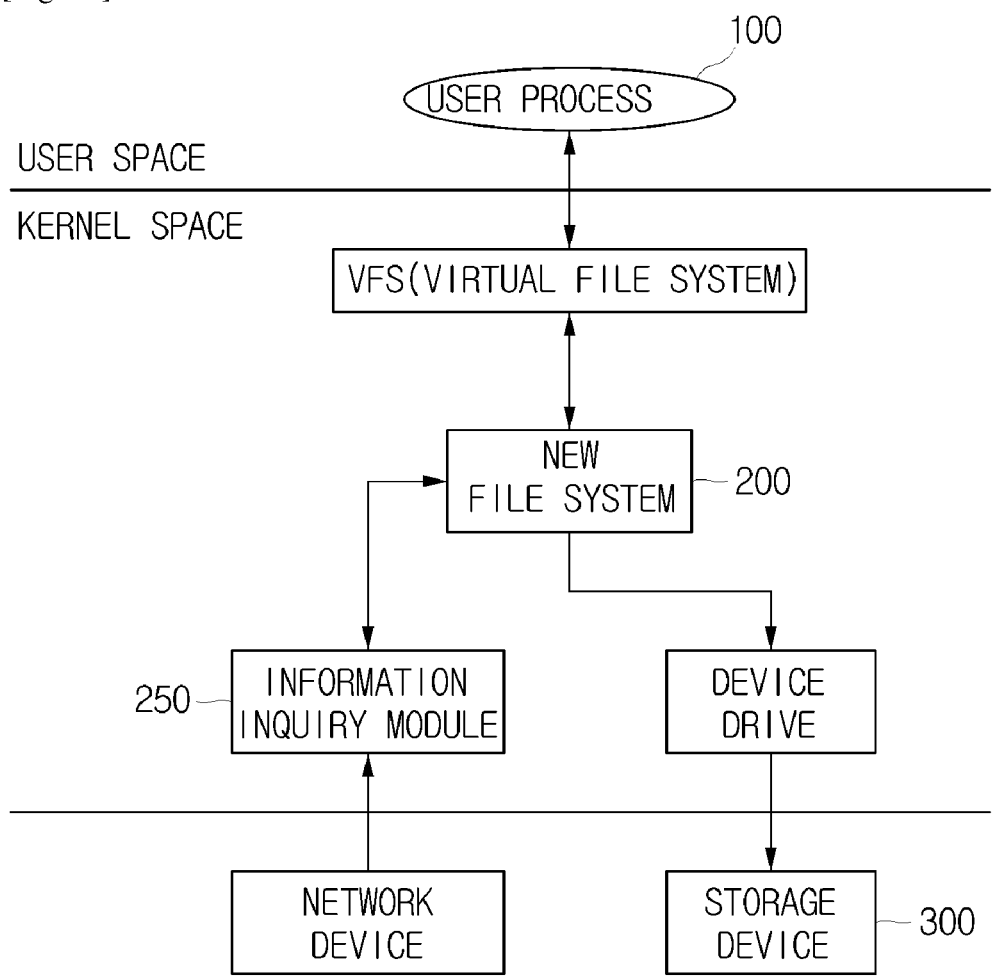

[Fig. 2b]
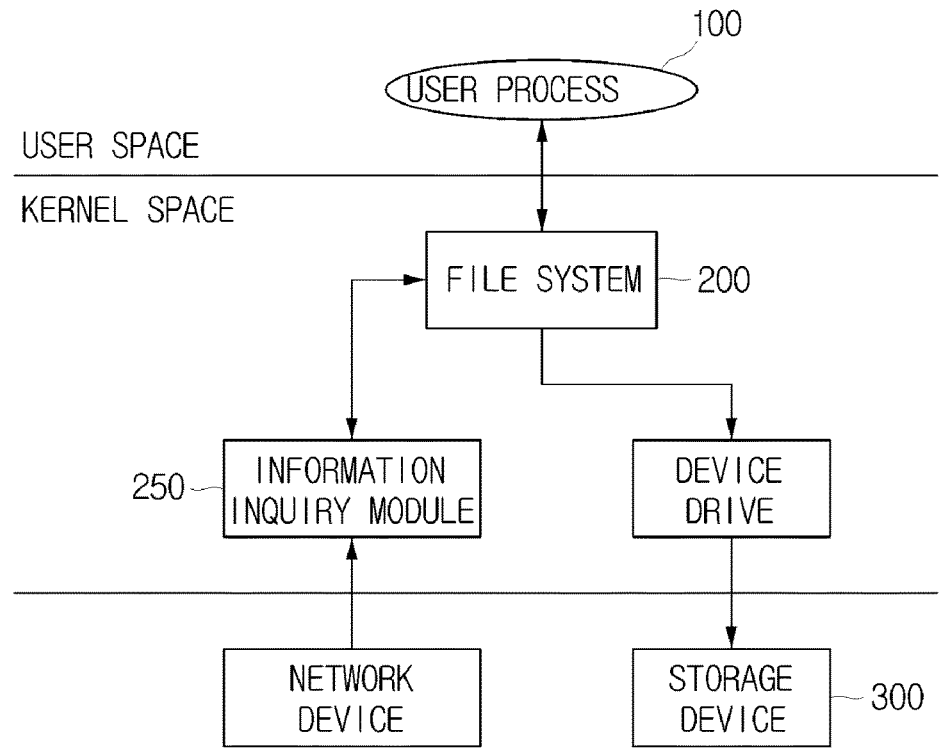
[Fig. 3]
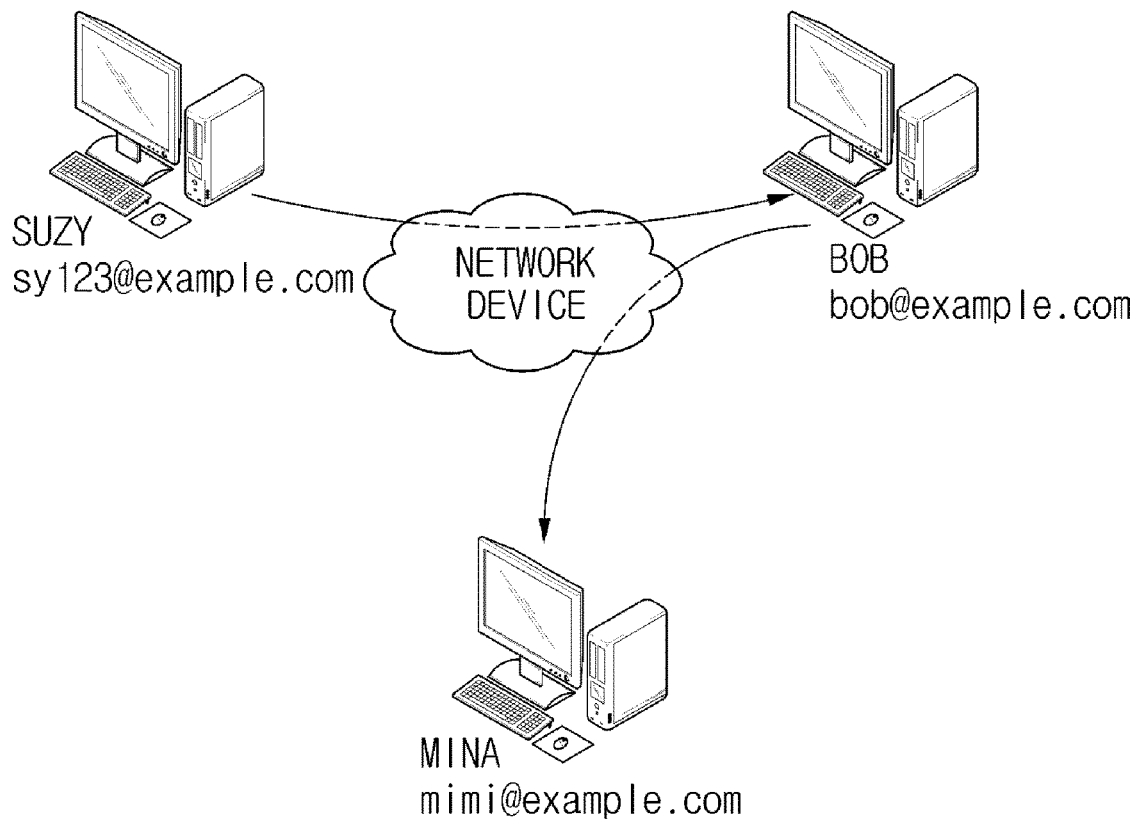

METHOD FOR MANAGING ATTRIBUTE INFORMATION OF FILES

FIELD OF THE DISCLOSURE

The present disclosure relates to a method for managing attribute information of a file and a computing device using the same.

BACKGROUND OF THE DISCLOSURE

Recently, the number of files managed by computers is increasing due to development and the widespread use of computers. Documents like reports, plans and contracts which were processed as papers in the old times, are now managed electronically using computers, and they are more differentiated for use in business. A total amount of electronic documents is on the rise continuously, and it grows still more as various mobile devices are used for document management.

However, a problem arises when users cannot find the file they want, because they cannot remember exactly the file's location or its name. The users may utilize file searching programs like a windows explorer or a finder but the problem is still there if they cannot recall exactly the file names or the folders storing the file. The reason is that the file searching programs compare the keywords inputted by users with attribute information when searching for the file, but the attribute information of the file is limited to a small amount and that makes the keywords that the users may input very limited. That is to say, the information saved as the attribute information about an electronic document is somewhat limited to a file creation date, a file modification date, a file name, a file size, a file editor, a file type and etc. and the file can be found by keywords related only to this information.

SUMMARY OF THE DISCLOSURE

It is an object of the present disclosure to allow a user to search for files they want with speed and ease.

It is another object of the present disclosure to identify an origin and a distributive route of a file with ease.

In accordance with one aspect of the present disclosure, there is provided a method for managing attribute information of files, including steps of: (a) a first computing device receiving a file with first origin information as attribute information from a second computing device or from a third computing device connected via the second computing device; and (b) the first computing device instructing a file system to acquire second origin information from information related to the first computing device, the second computing device or the third computing device connected via the second computing device and to insert the second origin information into the attribute information of the file along with the first origin information.

In accordance with another aspect of the present disclosure, there is provided a main computing device for managing attribute information of a file, including: a communication part for receiving a file with first origin information inserted into attribute information thereof from a second computing device or from a third computing device connected via the second computing device; and a processor for instructing a file system to acquire a second origin information from information related to the main computing device, the second computing device, or the third computing device connected via the second computing device, and to insert the second origin information into the attribute information of the file along the first origin information therein.

BRIEF DESCRIPTION OF THE DRAWINGS

The above and other objects and features of the present disclosure will become apparent from the following description of preferred embodiments given in conjunction with the accompanying drawings, in which:

FIG. 1 is a diagram illustrating an overall configuration for storing attribute information of a file in accordance with one example embodiment of the present disclosure.

FIGS. 2A and 2B show exemplarily an operation of a file system in accordance with one example embodiment of the present disclosure.

FIG. 3 shows exemplarily the attribute information acquired additionally in accordance with one example embodiment of the present disclosure.

DETAILED DESCRIPTION OF THE PREFERRED EMBODIMENTS

In the following detailed description, reference is made to the accompanying drawings that show, by way of illustration, specific embodiments in which the disclosure may be practiced. These embodiments are described in sufficient detail to enable those skilled in the art to practice the disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

FIG. 1 is a diagram illustrating an overall configuration for storing attribute information of a file in accordance with one example embodiment of the present disclosure. As illustrated in FIG. 1, a computing device for managing attribute information of a file may include a user process 100, a file system 200 and a storage device 300 and the user process 100, the file system 200 and the storage device 300 may be operated by a processor and a communication part of the computing device in accordance with one example embodiment of the present disclosure.

First of all, the user process 100, which is an application program or a subprogram written for handling specific business, may request the file system to store a file via a system call. Specifically, the user process 100 may be a word processor, an email program or a browser program.

The file system 200 may be a system capable of naming a file and determining on which section of the storage device 300 the file should be placed. The file system 200 may acquire origin information about the file and save it as attribute information. The file system 200 may apply to conventional file systems like FAT, NTFS, UFS, ext2 or etc. or may be a file system that is to be newly created.

Herein, the origin information may be information representing who created or modified a file, where the file is acquired or the like and may include at least part of editor information or file acquisition path information. Moreover, the origin information may further include IP information, physical location information and folder history information representing respectively, an IP address of a computing device at which a file was created, modified or acquired, a physical location where the file was created, modified or acquired and a folder the file was being stored.

The storage device 300, which may store data temporarily or permanently, may be one of a primary storage device, an auxiliary storage device or a special storage device. The storage device 300 may not be physically included in a computing device and may exist externally linked to the computing device.

This file system 200 in accordance with the present disclosure may be described in sufficient detail by referring to following description.

FIGS. 2A and 2B are diagrams showing operation of a file system 200 in accordance with one example embodiment of the present disclosure.

By referring to FIG. 2A, if a request for saving a file is generated from the user process 100, the request may be transmitted to a virtual file system (VFS) or an actual file system and in the former case, basic attribute information such as data information of the file, a process ID, a file path and a file name is transmitted to the VFS. Thereafter, the VFS verifies a validity of the file path, queries a device manager about the file system 200 of the file path and then transmits a request for saving to an appropriate file system by referring to information on the file path and allows the file system 200, to store the data information and the attribute information of the file in the storage device 300 by referring to the information received from the VFS. Meanwhile, by referring to FIG. 2B, if the VFS does not exist, basic attribute information, such as the data information and the process ID of the file, the file path and the file name of the file, is transmitted directly to the file system and then the data information and the attribute information of the file is stored in the storage device 300.

The file system 200 may acquire and save the origin information as the attribute information, as well as the basic attribute information of the file.

A table 1 shows examples of the basic attribute information of files managed by New Technology File System (NTFS) as follows:

TABLE 1

| Starting addr. (relative addr.) | Attr. Name | Comment |
| --- | --- | --- |
| 0X10 | STANDARD INFORMATION (required) | General info such as a file creation date, a file modification date or a file owner |
| 0X20 | ATTRIBUTE LIST | Additional attributes list |
| 0X30 | FILE_NAME (required) | file name, Creation time and modification time of files |
| 0X40 | VOLUME_VERSION | Volume info (WINDOWS NT) |
| 0X40 | OBJECT_ID | Info for 16 bit system |
| 0X50 | SECURITY_DESCRIPTOR | Access control of files |
| 0X60 | VOLUME NAME | Volume name |

TABLE 1-continued

| Starting addr. (relative addr.) | Attr. Name | Comment |
| --- | --- | --- |
| 0X70 | VOLUME INORMATION | Version configuration info of the file system 200 |
| 0X80 | DATA (required) | File content |
| 0X90 | INDEX_ROOT | Index tree root node. |
| 0XA0 | INDEX_ALLOCATION | Node linked with index root |
| 0XB0 | BITMAP | Allocation info of MFT and index |
| 0XC0 | SYMBOLIC LINK | Link info (WINDOWS2000 and higher) |
| 0XC0 | REPARSE POINT | Link info (WINDOWS2000 and higher) |
| 0XD0 | EA INFORMATION | OS/2 compatibility info |
| 0XE0 | EA | OS/2 compatibility info |
| 0X100 | LOGGED UTILITY STREAM | Key value for viewing encrypted attributes (WINDOWS 2000 and higher) |

Explaining storage of the origin information as the attribute information beside basic attributes in NTFS by referring to table 1, first of all, the attribute information to be stored mandatorily in a file among the seventeen properties defined in NTFS is a file creator, a file name, a creation date of the file, a modification time of the file and data (content) of the file, and in accordance with the present disclosure, the origin information may be added as the attribute information. Specifically, the origin information may be added by writing a starting address and an attribute name of the origin information onto an ATTRIBUTE LIST, which is a basic property of NTFS, and other attribute information may be further added.

The attribute information, which may be further added other than the basic attribute information, may be the origin information (which may include at least part of the editor information, the file acquisition path information, the IP information, the physical location information or the folder history information), version information, situational information (which may include weather information) or date and time information and this will be described in sufficient detail as follows.

First of all, explaining a storing process of specific origin information on the file as the attribute information, if the file system 200 of a first computing device acquires request information for saving the file, the file system 200 may acquire and save the specific origin information on the file as the attribute information. Herein, if the file is received from a second computing device or a third computing device connected via the second computing device and if the file has already existing origin information as the attribute information, then the file system 200 may manage each piece of origin information, i.e., the specific origin information and the existing origin information, as the attribute information.

Specifically, if the first computing device receives the file with the first origin information as the attribute information from the second computing device or the third computing device connected via the second computing device, the first computing device may instruct the file system 200 to acquire the second origin information from the information related to the first computing device, the second computing device or the third computing device connected via the second computing device and to insert the second origin information into the attribute information of the file along with the first origin information.

If the origin information about the file is the editor information, the first computing device may instruct the file system 200 to acquire the second origin information from the information related to the first computing device and to insert the second origin information into the attribute information of the file along with the first origin information and if the origin information about the file is the file acquisition path information, the first computing device may instruct the file system 200 to acquire the second origin information from the information related to the second computing device or the third computing device connected via the second computing device and to insert the second origin information into the attribute information of the file along with the first origin information. Further, if the origin information about the file is the IP information or the folder history information, the first computing device may instruct the file system 200 to acquire the second origin information from the IP information or the folder history information of the first computing device and to insert the second origin information into the attribute information of the file along with the first origin information, and if the origin information about the file is the physical location information, the first computing device may instruct the file system 200 to acquire the second origin information by a method of identifying a physical location of the first computing device and to insert the second origin information into the attribute information of the file along with the first origin information. Such a method of identifying the physical location may include a method of utilization of Global Positioning System (GPS), triangulation based on the strength of the signals from cellular communication base stations or utilization of addresses known as corresponding to the IP information over a network, but not limited to these as well known to those skilled in the art.

Herein, the first computing device may be a computing device with a similar structure as FIG. 2A or FIG. 2B, and the second computing device may be a terminal device used by other users that transmitted the corresponding file to the first computing device. The third computing device, if other users used the second computing device to connect to a certain email server and sent the corresponding file as an attachment, may be the corresponding email server.

Herein, the information related to the second computing device may be the second computing device ID or the owner information of the second computing device and the information related to the third computing device may include information about the email server or user information of the email server.

Additionally, herein, the first origin information may be the origin information acquired prior to the second origin information, and the file system 200 may create an attribute identifier to distinguish between the existing first origin information and the newly obtained second origin information.

Herein, in case the editor information is acquired as the origin information, the file system 200 may acquire the name of the user's computer from system information and in case the file acquisition path information is acquired as the origin information, the file acquisition path information may be acquired by an information inquiry module.

For example, in case a user named Suzy edits and saves a Word document titled 'Proposition.doc', the Word program may transmit a request for saving 'Proposition.doc' to the file system 200 by issuing a system call and the file system 200 may acquire and store the editor information as the origin information of 'Proposition.doc' in the attribute information and the editor information may be the name of Suzy's computing device. Thereafter, in case Suzy transmits 'Proposition.doc' to Bob, and Bob edits and stores this file in Bob's computing device, since the first editor information (the name of Suzy's computing device) exists in the attribute information of 'Proposition.doc', the file system 200 (the file system of Bob's computing device) may acquire the name of Bob's computing device as the second editor information and save it as the attribute information.

Herein, an attribute type of the first and the second editor information saved as the attribute information of 'Proposition.doc' is the same as both are the editor information, therefore, the first and the second editor information may be distinguished by giving the attribute identifier. Herein, the attribute identifier may be given sequentially. This is for sequential recording of users who modified the file, and this allows a user to intuitively identify a process of creating the file using the attribute information and to easily search the file.

On the other hand, by referring to FIGS. 2A and 2B, the file system 200 may include an information inquiry module 250, and in case a request for saving a file is generated by a certain email program, the file system 200 may acquire email sender information included in a packet from the information inquiry module 250 and save it as the file acquisition path information. In general, a user sends an email to other users to transmit a file. Thus if the email address of the sender is saved as the attribute information when the file attached in the email is downloaded and saved, a location where the file originated from may be known and if the user remembers who sent the email, the user may search for files using the email address as a keyword.

Herein, the information inquiry module 250 may be a program that can analyze packets acquired by using a network device, and may include one or more of network analysis programs such as sniffer, Wireshark, Tcpdump or snoop.

The file system 200 may acquire editor information or file acquisition path information in case one or more preset conditions are met. Herein, the preset conditions may include a condition of limiting the number of acquisition and storage of the editor information or the file acquisition path information. For example, in case the editor information is recorded whenever a specific file is modified and the number of acquisition of the editor information is limited to ten, if the specific file is modified eleventh time, the file system 200 may select and record the unique editor information from the ten pieces of the editor information already recorded so that the file system 200 may reduce the total number of pieces of the editor information and then may store the name of the computing device that modified the specific file eleventh time as the editor information. Moreover, the file system 200 may delete the editor information written first and keep the number of the pieces of the editor information at ten (from the second to the eleventh editor information).

In this case, by limiting the number of the editor information or the file acquisition path information being held, excessive accumulation of the attribute information may be prevented but this may not be the only method.

Additionally, the file system 200 may adjust the preset conditions by referring to a level corresponding to the editor information. In detail, if the origin information must be all written or written frequently whenever a specific file is modified, the preset conditions may be adjusted according to the level corresponding to the editor information, e.g., the level corresponding to a computing device.

Further, explaining a process of storing the version information on the file as the attribute information, if the file system 200 acquires the request information for saving a file, the file system may further acquire and store the version information, as the attribute information, determined according to one or more preset rules. The preset rules may be defined by referring to a case of a file being newly created, of a file being modified or of a location or a name of a file being modified.

If an original file does not exist as the file is newly created, the file system 200 may determine the version information of the file as a base version and save the attribute information by referring to the preset rules. Herein, the base version may be set as, but not limited to, ver. 1.0.

On the other hand, if the original file corresponding to the file exists, in case data information of the file is determined to be modified, the file system 200 may determine the version information by increasing a version number of the file and save it as the attribute information by referring to the preset rules. If a file saving path or the name of the file is determined to be modified, the file system 200 may determine the version information as that of the original file and save it as the attribute information.

Further explaining a process of storing the situational information or the date and time information of the file as the attribute information, the file system 200 may further acquire and store the situational information representing weather at a time of the file being saved or the date and time information thereat as the attribute information. If the weather information or the date and time information at the time of saving the file is stored as the attribute information, the user may find files by inputting the keywords related to the weather, the date or a season at the time of file acquisition. Herein, the weather information may be acquired by accumulation thereof in advance using a small scale information search and storage system (for example, a memory or a lightweight database like SQLITE) linked with the file system 200 and by inquiring the weather corresponding to the saving time of the file.

If receiving a file with first situational information or first date and time information as the attribute information from the second computing device or the third computing device connected via the second computing device, the file system 200 may insert second situational information or second date and time information at the time of the file being saved into the attribute information of the file along with the first situational information or the first date and time information. Herein, the first situational information or the first date and time information may be the information acquired prior to the second situational information or the second date and time information, and the file system 200 may create the attribute identifier to distinguish between the existing information and the newly obtained information.

On the other hand, at least part of the basic attribute information and other attribute information (the origin information, the version information, the situational information or the date and time information, etc.) that can be further added may be included in the name of the file.

FIG. 3 shows exemplarily the attribute information acquired additionally in accordance with one example embodiment of the present disclosure. By referring to FIG. 3 below, the attribute information written when the file is modified in order by Suzy, Bob and Mina is explained as an example and the names of the computing devices of Suzy, Bob and Mina are identical to the names of the respective users.

First of all, when Suzy modifies a Word document named 'Proposition.doc' at the time of Jan. 1, 2016, 5 o'clock P.M., the attribute information of 'Proposition.doc' may be written as the table 2 below:

TABLE 2

| Attr. name | Creator info | Creation time info | Program info | Ver. info | Editor info | Date and time info | File acquisition path info |
|---|---|---|---|---|---|---|---|
| Content | Suzy | 2016 Jan. 21 17:00 | Word | 1.0 | Suzy | 2016 Jan. 21 17:00 | — |

Herein, the creator information, the creation time information and the program information in the attribute information of the file 'Proposition.doc' is essential attribute information, and the version information, the editor information, the file acquisition path information and the date and time information is the attribute information additionally acquired and stored.

To put it concretely, the creator information and the editor information may be the name of Suzy's computing device, and the creator information is about the user who created the file and the editor information is accumulation of information on users who modified the file, therefore, in this case, as the file 'Proposition.doc' is created by Suzy, the creator information and the editor information is identical.

On the other hand, the creation time information is about a time the file is created and the date and time information is accumulation of times the file is modified, therefore, in this case, as the file 'Proposition.doc' is created by Suzy, the creation time information and the date and time information is identical.

As the file 'Proposition.doc' is a first file created, the version information is written as ver. 1.0 and the file acquisition path information does not exist.

If Suzy creates the file, attaches the file to an email and sends the email to Bob, and Bob downloads and saves the file into Bob's computing device, the attribute information of the file 'Proposition.doc' may be written as the table 3 below.

TABLE 3

| Attr. name | Creator info | Creation time info | Program info | Ver. info | Editor info | Date and time info | File acquisition path info |
|---|---|---|---|---|---|---|---|
| Content | Suzy | 2016 Jan. 21 17:00 | Word | 1.0 | Suzy | 2016 Jan. 21 17:00 | sy123@example.com |

Herein, the information in the attribute information of the file 'Proposition.doc' that Bob downloaded, except the file acquisition path information, may be identical to the attribute information of the file Suzy created, and the file acquisition path information may be Suzy's email address. A sender's email address may be acquired by the file system analyzing packets through the information inquiry module as explained above.

Thereafter, if Bob modifies and saves the file 'Proposition.doc' at the time of Jan. 22, 2016, 11 o'clock A.M., the attribute information of the file 'Proposition.doc' may be written as the table 4 below.

TABLE 4

| Attr. name | Creator info | Creation time info | Program info | Ver. info | Editor info | Date and time info | File acquisition path info |
|---|---|---|---|---|---|---|---|
| Content | Suzy | 2016 Jan. 21 17:00 | Word | 1.5 | Suzy, Bob | 2016 Jan. 21 17:00, 2016 Jan. 22 11:00 | sy123@example.com |

Herein, the version information, the editor information and the date and time information in the attribute information of the file 'Proposition.doc' may be modified or added. As Bob modified the file, the version information may be modified to be 1.5 by referring to the preset rules, 'Bob' may be added to the editor information and the date and time of the file modification may be added to the date and time information.

If Bob modifies the file, attaches the file to an email and sends the email to Mina, and Mina saves the file into Mina's computing device and modifies the file at the time of Jan. 28, 2016, 1 o'clock P.M., the attribute information of the file 'Proposition.doc' stored in the computing device of Mina may be written as the table 5 below.

TABLE 5

| Attr. Name | Creator info | Creation time info | Program Info | Ver. Info | Editor info | Date and time Info | File acquisition path info |
|---|---|---|---|---|---|---|---|
| Content | Suzy | 2016 Jan. 21 17:00 | Word | 2.0 | Suzy, Bob, Mina | 2016 Jan. 21 17:00, 2016 Jan. 22 11:00, 2016 Jan. 28 13:00 | sy123@example.com, bob@example.com |

In this case, the version information, the editor information and the date and time information in the attribute information of the file 'Proposition.doc' may also be modified or added. As Mina modified the file, the version information may be modified to be 2.0 by referring to the preset rules, 'Mina' may be added to the editor information and the date and time of the file modification may be added to the date and time information.

Thereafter, if Mina wants to find 'Proposition.doc' using a file search program, she can easily find the file using the information stored as the attribute information of the file as keywords. For example, if Mina could remember that she received the file from the email sent by Bob, she may search for the file by inputting the email address (bob@example.com) of Bob as a keyword.

On the other hand, though not explained here, it is obvious that the situational information representing weather at the time of a file being saved may be further included as the attribute information.

In accordance with the present disclosure, the users may find files they want via links among files and remembrance by defining elements that can be remembered about files by users as attribute information.

Further, in accordance with the present disclosure, a file's origin may be easily identified by storing accumulated information about the process of file creation and modification in the attribute information, and this may be a criterion by which the value of the file to be stored can be evaluated.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims. Accordingly, the thought of the present disclosure must not be confined to the explained embodiments, and the following patent claims as well as everything including variations equal or equivalent to the patent claims pertain to the category of the thought of the present disclosure.

The invention claimed is:

1. A method for managing attribute information of a file, comprising steps of:
   (a) a first computing device receiving a file with a first origin information inserted into attribute information thereof from a second computing device or from a third computing device connected via the second computing device; and
(b) the first computing device instructing a file system to acquire a second origin information from information related to the first computing device, the second computing device, or the third computing device connected via the second computing device, and to insert the second origin information into the attribute information of the file along the first origin information therein;
wherein the first and the second origin information include at least part of creator information and file acquisition path information, and
wherein the first computing device instructs the file system to acquire the creator information or the file acquisition path information if one or more conditions are met.

2. The method of claim 1, wherein, at the step of (b), the file system creates an attribute identifier to distinguish between the existing first origin information and the newly obtained second origin information, and saving the second origin information.

3. The method of claim 1, wherein, if the first and the second origin information is the creator information,
wherein, at the step of (b), the first computing device instructs the file system to acquire the second origin information from the information related to the first computing device and to insert the second origin information into the attribute information of the file along with the first origin information therein.

4. The method of claim 1, wherein, if the first and the second origin information is the file acquisition path information,
wherein, at the step of (b), the first computing device instructs the file system to acquire the second origin information from the information related to the second computing device or from the information related to the third computing device connected via the second computing device and to insert the second origin information into the attribute information of the file along with the first origin information therein.

5. The method of claim 1, wherein the certain conditions include conditions of limiting the number of acquisition of the creator information or the file acquisition path information.

6. The method of claim 5, wherein the certain conditions are adjusted by referring to the creator information or the file acquisition path information.

7. The method of claim 1, the first computing device instructs the file system to further acquire version information, as the attribute information, determined by one or more preset rules and to save the version information.

8. The method of claim 7, wherein, in case an original version of the file does not exist, the preset rules determine the version information of the file as base version information, and
wherein, in case the original version of the file exists, (i) if data information of the file is determined to be modified, the preset rules determine version information of the original version by increasing a version number thereof, and (ii) if a path by which the file is being saved or a file name of the file is determined to be modified, the preset rules determine the version information of the original version as the current version information.

9. The method of claim 1, the first computing device instructs the file system to further acquire situational information representing weather at a time of the file being saved or date and time information at the time of the file being saved, as the attribute information, and to save the attribute information.

10. The method of claim 9, wherein, if the first computing device receives the file with first situational information or first date and time information from the second computing device or the third computing device connected via the second computing device, the first computing device instructs the file system to insert second situational information at the time of the file being saved or second date and time information thereat into the attribute information of the file along with the first situational information or the first date and time information.

11. The method of claim 1, the first computing device inserts at least part of the attribute information of the file into the file name thereof.

12. The method of claim 1, if the file system is NTFS (New Technology File System), the file system writes a starting address and an attribute name of the first and the second origin information on an ATTRIBUTE LIST which is a base attribute of the file system.

13. The method of claim 1, the first and the second origin information on the file includes at least part of IP information, physical location information and folder history information.

14. A method for managing attribute information of a file, comprising steps of:
(a) a first computing device receiving a file with a first origin information inserted into attribute information thereof from a second computing device or from a third computing device connected via the second computing device; and
(b) the first computing device instructing a file system to acquire a second origin information from information related to the first computing device, the second computing device, or the third computing device connected via the second computing device, and to insert the second origin information into the attribute information of the file along the first origin information therein;
wherein the first and the second origin information include at least part of creator information and file acquisition path information, and
wherein, if a request for saving the file is generated from a certain email program, the file system acquires email sender information included in a packet from an information inquiry module and saves the email sender information as the file acquisition path information.

15. The method of claim 14, wherein the information inquiry module includes at least one network analysis program of sniffer, Wireshark, Tcpdump and snoop.

16. A first computing device for managing attribute information of a file, comprising:
a communication part for receiving a file with a first origin information inserted into attribute information thereof from a second computing device or from a third computing device connected via the second computing device; and
a processor for instructing a file system to acquire a second origin information from information related to the first computing device, the second computing device, or the third computing device connected via the second computing device, and to insert the second origin information into the attribute information of the file along the first origin information therein;

wherein the first and the second origin information include at least part of creator information and file acquisition path information, and wherein the processor instructs the file system to acquire the creator information or the file acquisition path information if one or more conditions are met.

17. The first computing device of claim 16, wherein, the file system creates an attribute identifier to distinguish between the existing first origin information and the newly obtained second origin information, and saving the second origin information.

18. The first computing device of claim 16, wherein, if the first and the second origin information is the creator information, the first computing device instructs the file system to acquire the second origin information from the information related to the first computing device and to insert the second origin information into the attribute information of the file along with the first origin information therein.

19. The first computing device of claim 16, wherein, if the first and the second origin information is the file acquisition path information, the first computing device instructs the file system to acquire the second origin information from the information related to the second computing device or from the information related to the third computing device connected via the second computing device and to insert the second origin information into the attribute information of the file along with the first origin information therein.

20. The first computing device of claim 16, wherein the certain conditions include conditions of limiting the number of acquisition of the creator information or the file acquisition path information.

21. The first computing device of claim 20, wherein the certain conditions are adjusted by referring to the creator information or the file acquisition path information.

22. The first computing device of claim 16, the processor instructs the file system to further acquire version information, as the attribute information, determined by one or more preset rules and to save the version information.

23. The first computing device of claim 22, wherein, in case an original version of the file does not exist, the preset rules determine the version information of the file as base version information, and wherein, in case the original version of the file exists, (i) if data information of the file is determined to be modified, the preset rules determine version information of the original version by increasing a version number thereof, and (ii) if a path by which the file is being saved or a file name of the file is determined to be modified, the preset rules determine the version information of the original version as the current version information.

24. The first computing device of claim 16, the processor instructs the file system to further acquire situational information representing weather at a time of the file being saved or date and time information at the time of the file being saved, as the attribute information, and to save the attribute information.

25. The first computing device of claim 24, wherein, if the file with first situational information or first date and time information from the second computing device or the third computing device connected via the second computing device is received, the processor instructs the file system to insert second situational information at the time of the file being saved or second date and time information thereat into the attribute information of the file along with the first situational information or the first date and time information.

26. The first computing device of claim 16, the processor inserts at least part of the attribute information of the file into the file name thereof.

27. The first computing device of claim 16, if the file system is NTFS (New Technology File System), the file system writes a starting address and an attribute name of the first and the second origin information on an ATTRIBUTE LIST which is a base attribute of the file system.

28. The first computing device of claim 16, the first and the second origin information on the file includes at least part of IP information, physical location information and folder history information.

29. A first computing device for managing attribute information of a file, comprising:

a communication part for receiving a file with a first origin information inserted into attribute information thereof from a second computing device or from a third computing device connected via the second computing device; and a processor for instructing a file system to acquire a second origin information from information related to the first computing device, the second computing device, or the third computing device connected via the second computing device, and to insert the second origin information into the attribute information of the file along the first origin information therein;

wherein the first and the second origin information include at least part of creator information and file acquisition path information, and wherein, if a request for saving the file is generated from a certain email program, the file system acquires email sender information included in a packet from an information inquiry module and saves the email sender information as the file acquisition path information.

30. The first computing device of claim 29, wherein the information inquiry module includes at least one network analysis program of sniffer, Wireshark, Tcpdump and snoop.

* * * * *